May 9, 1961     G. K. MURPHY     2,983,230
PASSENGER VEHICLE COMPARTMENT ARRANGEMENTS
Filed June 26, 1957     2 Sheets—Sheet 1

INVENTOR
Goodrich K. Murphy
BY Wm. R. Glisson
ATTORNEY

May 9, 1961 G. K. MURPHY 2,983,230
PASSENGER VEHICLE COMPARTMENT ARRANGEMENTS
Filed June 26, 1957 2 Sheets-Sheet 2

INVENTOR
Goodrich K. Murphy
BY
Wm. R. Glisson
ATTORNEY

United States Patent Office 2,983,230
Patented May 9, 1961

2,983,230

PASSENGER VEHICLE COMPARTMENT ARRANGEMENTS

Goodrich K. Murphy, New Canaan, Conn., assignor to The Budd Company, Philadelphia, Pa., a corporation of Pennsylvania Filed June 26, 1957, Ser. No. 668,248

4 Claims. (Cl. 105—315)

This invention relates to passenger compartment arrangements of the general type disclosed in my copending applications, Serial No. 343,870, filed March 23, 1953, now Patent No. 2,808,787, October 8, 1957, Serial No. 540,300, filed October 13, 1955, now Patent No. 2,914,001 dated Nov. 24, 1959 Serial No. 624,610, filed November 27, 1956, now Patent No. 2,914,002 dated Nov. 24, 1959 and Serial No. 656,800, filed May 3, 1957, now Patent No. 2,946,294 dated July 26, 1960 especially to the three-compartment modules or units of the second and third, and has for an object the provision of improvements in this art.

One of the specific objects of the invention is to provide compartment accommodations which have the maximum useful space for the vehicle space which is taken up.

Another object is to provide hinged doors which take up less aisle wall thickness and which are less noisy than sliding doors.

Another object is to provide a multi-room module or unit in which the end transverse partition walls are plain, the alcove-boot irregularities needed being taken by intermediate transverse walls, whereby the module can be used with others without interferences and whereby construction costs can be minimized.

Another object is to simplify the construction by making the arrangement substantially symmetrical about a transverse longitudinally central plane with the intermediate transverse walls formed as mirror duplicates of each other. This allows the walls, when made of glass fiber and plastic as is convenient, to be made on mirror identical forms with considerable saving in cost.

Another object is to minimize interior wall irregularities in the bed spaces, specifically having only a single-length space in each room for all the bed accommodations therein.

Another object is to have all seats placed on the outer wall side at a window.

Another object is to minimize the presence of toilets abreast of seats, all except one seat being diagonally opposite a toilet.

Another object is to provide fixed toilets instead of folding toilets.

Another object is to provide communication between end rooms of adjacent modules and when the communicating doors are not used to have the passage space therefor clear for luggage, for hanging clothes or for other uses, and when not used for that, left for standing.

Another object is to provide a full-length bed on a single frame for a double occupancy room.

Another object is to provide means for forming full-length beds for each single occupancy room with a single relatively long hinged support part or frame and a fixed support part, the hinged part resting on a seat back when in the down or use position.

Another object is to provide means for forming a full-length lower bed for the double occupancy compartment with two hinged bed parts which are supported on two seat backs when in the down or use position.

Another object is to provide infant's beds in a space clear of the hinged beds in the single occupancy rooms.

The above and other objects and various features of the invention will be apparent from the following description of an exemplary embodiment thereof reference being made to the accompanying drawings wherein.

Figure 1:
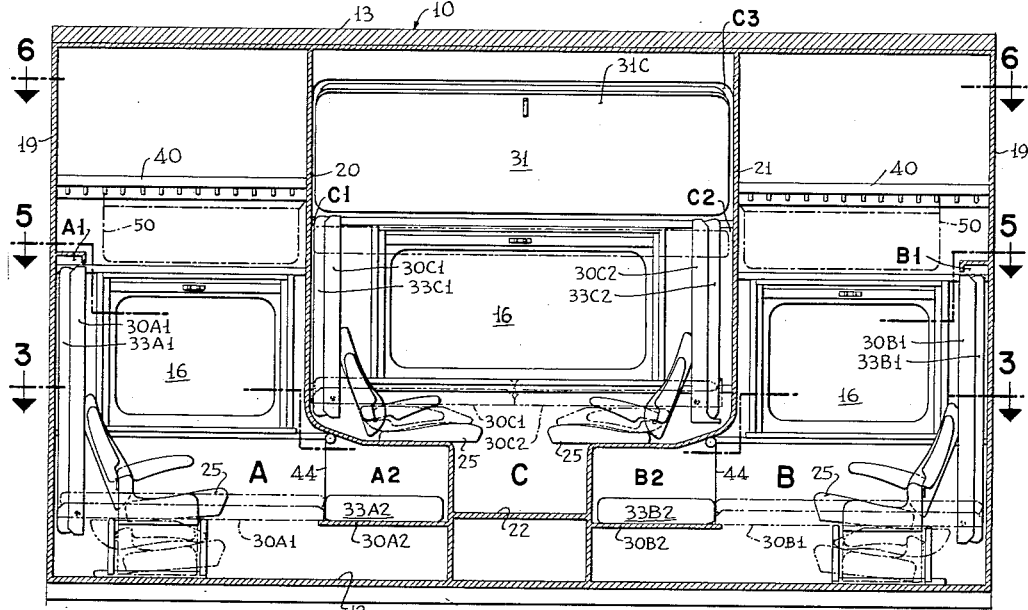
Fig. 1 is a vertical longitudinal section through a portion of a vehicle, such as a railway passenger car equipped with accommodations embodying the present invention, the view being taken on the line 1—1 of Figs. 3, 4, 5 and 6.
Figure 2:
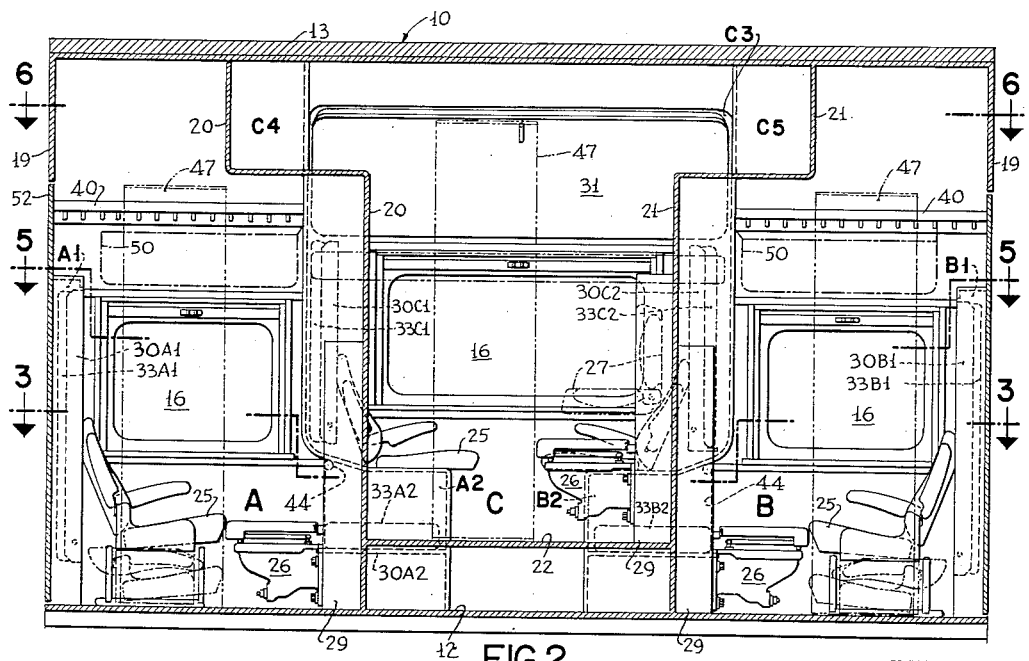
Fig. 2 is a vertical longitudinal section taken on the line 2—2 of Figs. 3, 4, 5 and 6.
Figure 3:
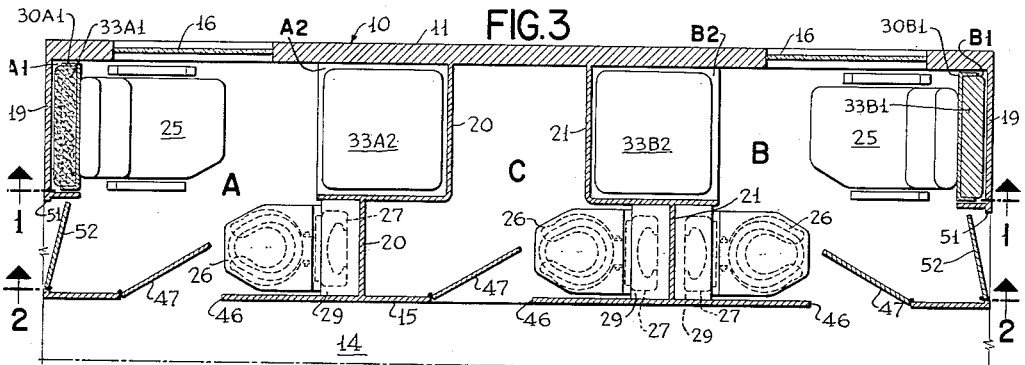
Fig. 3 is a horizontal section taken on the line 3—3 of Figs. 1 and 2, the parts being shown in position for day or non-sleeping occupancy.
Figure 4:
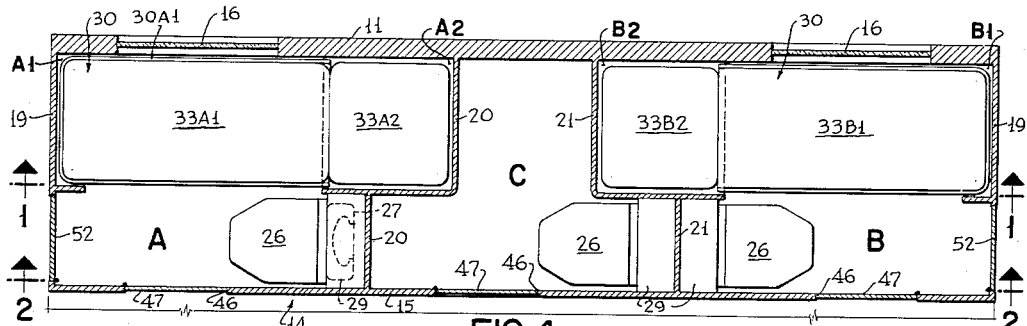
Fig. 4 is a horizontal section like Fig. 3 but showing the parts in the position for night or sleeping occupancy.
Figure 5:
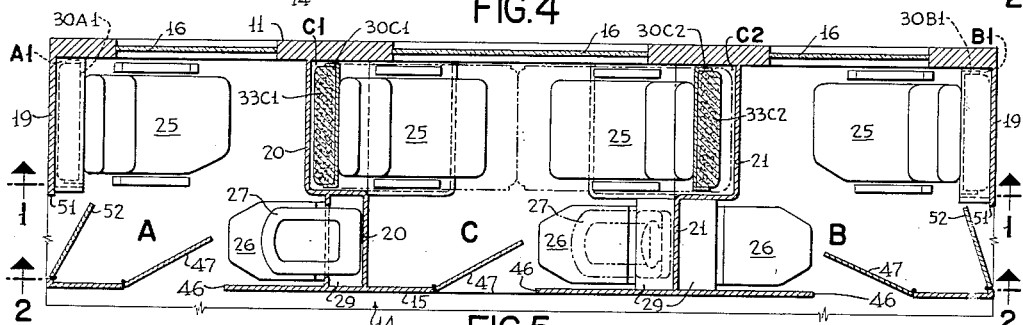
Fig. 5 is a horizontal section taken on the line 5—5 of Figs. 1 and 2.
Figure 6:
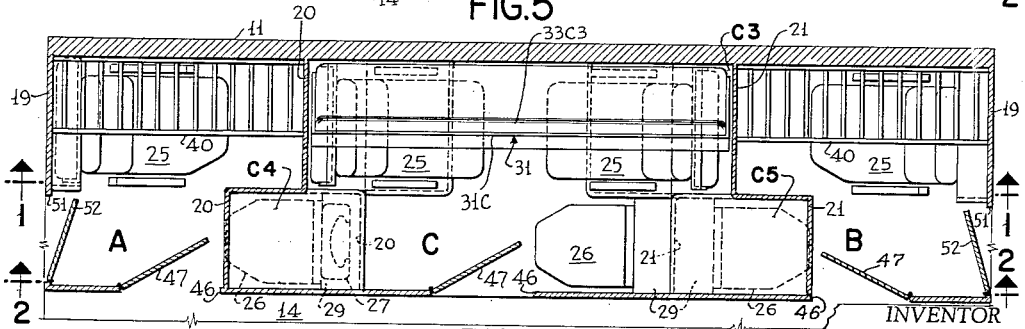
Fig. 6 is a horizontal section taken on the line 6—6 of Figs. 1 and 2.

A vehicle, such as a railway passenger car 10, has longitudinal outer side walls 11, a floor 12, a roof 13, a center aisle 14, aisle walls 15, and windows 16. Between the aisle wall 15 and the side wall 11 on each side of the center aisle there are provided a plurality of transverse partition walls 19, 20 and 21 dividing the space into a plurality of separate passenger compartments or rooms A, B and C, the three together constituting a group unit or module which can be repeated without loss of space between units. For example, a standard 85 foot long railway car will take five such three-room units on each side, giving a total of twenty (20) single-occupancy rooms and ten (10) double-occupancy rooms to accommodate a total of forty (40) passengers. There is still sufficient space in the car for general toilets, an electric locker, linen lockers, vestibule, etc. The height required for the present accommodations is slightly more than that required for the accommodations of the copending applications referred to but is still within the range for use in standard height cars and in low-level cars if of the type having a depressed floor between trucks such as is found, for example, in the "Pioneer" and others which were recently introduced. In any case the total height in which the accommodations are provided is not greater than standard car height.

The three compartments or rooms of the unit or module which have been designated as A, B and C, comprise a single room A, shown at the left side of the figures, another single room B, shown at the right side of the figures, and a double room C, shown between the rooms A and B.

The single rooms A and B are substantially reverse or mirror duplicates of each other and the double room C is symmetrical about a central vertical transverse plane, except for the toilet accommodations, so it may be said that the entire module is almost symmetrical about a central vertical transverse plane. This, as can readily be seen, makes manufacture, installation and maintenance much simpler and easier. The floor 22 of the upper compartment or room C is disposed above the level of the floors of the single compartments but not at an objectionable height—as illustrated, about 13 inches—which requires only a single step (two risers).

In each compartment there are arranged a folding seat 25, a toilet or hopper 26, a folding wash basin 27 in a cabinet 29, a wall mirror (not shown) above the basin cabinet and a bed 30. In the double room C there are two seats 25. All seats are located at the outer wall side at a window. The toilets or hoppers 26 used herein are of the fixed instead of the folding type, the space in the compartments being adequate to receive fixed toilets without obstructing the space. Fixed toilets are usually preferred because they provide an extra seat when their upholstered covers are lowered. The toilets are all located at the aisle wall side for weather protection and convenient access and in each room there is a toilet located diagonally opposite a seat therein. Because of the fact that room C has two seats, the toilet must be located alongside one seat, in which case, a side splash guard, as disclosed in my prior application, may be used.

The bed elements of the different rooms will be designated by a suffix A, B and C to show which room they serve.

In room A there is a folding head end bed frame part 30A1 which folds up into an alcove A1 behind the folding seat back, and a fixed foot end bed frame port 30A2 which is constituted as the floor of a foot end alcove A2 which extends as a boot into the double compartment C beneath one of the seats therein. The mattress parts are designated as 33A1 and 33A2 for the head and foot end respectively.

In room B there is a folding head end bed frame part 30B1 in an alcove B1 and a fixed foot end bed frame part 30B2 constituting the floor of a foot end alcove B2 which extends as a boot into the double compartment C beneath the other seat therein. The mattress parts are designated as 33B1 and 33B2 for the head and foot end respectively.

In room C there is a lower bed comprising a folding head end frame part 30C1 in an alcove C1 and a folding foot end frame part 30C2 in an alcove C2. The bed mattress parts are designated as 33C1 and 33C2. In the present case the head end and foot end bed parts are substantially duplicates of each other but the head end is identified as the end opposite the toilet in like manner as for rooms A and B.

In room C there is also an upper bed 31 comprising an edge-hinged full-length frame 31C and mattress 33C3 stowable in a side wall and ceiling recess C3. The alcove-boot spaces C1 and C2 for the lower bed extend upward without break except for the shallow casing to enclose the lower bed parts, to receive the upper bed.

It is clear from the drawings and above description that the upper end of the end-hinged bed parts 30A1 and 30B1, when stowed, stand at an elevation well above the lower end of the end hinged bed parts 30C1 and 30C2, when stowed, and indeed stand at an elevation not greatly below the upper end of the bed parts 30C1 and 30C2. Also it will be noted that the upper end of the end-hinged bed parts 30C1 and 30C2, when stowed extend well into the use space of the edge-hinged upper bed part 31C.

In room C there are alcove boots C4 and C5 above the toilet facilities of rooms A and B respectively which provide baggage shelves for Room C.

There is ample space in rooms A and B for an infant's crib 50 beneath baggage racks 40 provided in these rooms.

It will be noted that all of the beds are located in a vertical longitudinal zone at the outer wall, that all of the seats are located in the same outer zone, that all of the toilets and wash-basins are located clear of the bed zone and adjacent the aisle wall. As stated, the toilets are all located diagonally opposite a seat in the compartment. The upper bed of the double room is easily reached by using the toilet top and basin as steps, the basin mounting being strong enough for this use.

The transverse wall 19 which forms the end division between modules or the end enclosures of a single module, as shown herein, is completely plain or flat, hence easy to manufacture and install. It may, of course, be double walled and sound-insulated, if desired. The bed alcoves or casings are secured to the main wall by bolts, screws, welding, etc., if of metal, and by integral formation, if of plastic.

The transverse walls 20 and 21 which form the interior partitions between the single rooms and the double room may be said to have their principal plane in the portion behind the basin cabinets 29, this portion extending up from the car floor to the floor of the baggage shelves in alcoves C4 and C5 in the aisle zone inboard of the bed zone. On the aisle side the walls at the top are recessed in the direction away from the interior of the double room to form the longitudinally deep recesses C4 and C5 for luggage. In the bed zone the walls 20 and 21 are recessed at the bottom to form the alcoves A2 and B2 for the foot end bed parts and thereabove are recessed in the opposite direction to form the recesses C1 and C2 for all bed parts of the upper double room. If desired, the walls in the bed zone may be cut away below the fixed bed frame support portions in the foot end alcoves A2 and B2 to provide additional storage space beneath the bed. This also provides additional foot-end space for an occupant in the room.

Roll curtains 44 are provided to close off the foot end alcoves A2 and B2.

Door openings 46 closed by hinged doors 47 are provided for the aisle walls of the compartments. The floor arrangement and toilet location permits the use of hinged folding doors. The doors swing away from the toilets in opening. If the floor space is left clear there is room for the doors to be swung around almost against the inside of the aisle wall. Hinged doors are much quieter than the usual sliding doors (unless very expensive anti-noise equipment is used) and the pocket space and inner wall space otherwise required for sliding doors is added to the interior space of the compartments.

The walls 19 between adjacent compartments of adjacent units are provided with door openings 51 and hinged doors 52 providing for use of two compartments of the same level as a suite. When not so used, the doors can be kept locked.

The seat backs in the single rooms may be slidably attached to a bed frame part as shown, so as to be moved up and down with the bed part; or, instead, loose folding chairs of known type may be used to permit the occupant to ride in any preferred direction or position.

It is thus seen that the invention provides comfortable, convenient, economical and high-capacity compartment accommodations for vehicles. In all rooms there is a comfortable seat at the window. Each room has its own toilet and basin both available for use at all times. Each room has its bed or beds at the outer wall. The rooms are of approximately double sitting width, the bed taking half or slightly more than half of this width but leaving clear standing space at all times alongside the bed. Each room has at least one bed which is formed of two parts, one or both of which is foldable into an alcove; and one room has a full-length folding bed. Each room has ample baggage space. Each room has a large window at a convenient height. The single rooms will accommodate an infant's hammock or crib. There is ample standing height in each room both in front of the seat and in front of the toilet. There are hinged aisle doors for each room giving more spacious occupancy quarters. There is a hinged door between adjacent compartments of a common level providing suite arrangements when desired.

While one embodiment of the invention has been described for purposes of illustration, it is to be understood that there may be various embodiments and modifications within the general scope of the invention.

What is claimed is:

1. In a passenger-carrying vehicle of standard inside height, in combination, a longitudinally extending outer side wall, a longitudinally extending aisle with a floor and a side aisle wall, a plurality of longitudinally spaced transverse partition walls dividing the space between said side wall and said aisle wall into a plurality of passenger occupancy compartments arranged in a unit group or module of three compartments, each compartment being approximately double sitting width and the length of the unit group or module of three compartments being less than three times a single reclining or sleeping length, each compartment having an aisle door, a seat, and longitudinal full-length bed accommodations in a vertical bed zone at the outer wall side, the bed accommodations being approximately half the width of the compartment and leaving standing and sitting width space between the bed and the aisle wall, at least two of the three compartments of a unit having floors at aisle floor level and the other compartment of a unit having a floor at a level at least as high as the aisle floor level, the intermediate transverse walls of a unit being offset longitudinally in the vertical longitudinal bed zone for the width of the bed zone to form oppositely projecting alcove spaces for receiving each a part of the length of the bed of adjacent compartments in overlapping relationship at each intermediate transverse wall, the beds being arranged in three levels in a unit, both of the intermediate transverse walls being formed to provide bed alcove space at the three bed levels, a bed part of greater than half the full bed length in each of the two end compartments hinged at its lower end to turn about a horizontal transverse axis at an outer or end transverse wall, said bed part being of sufficient length to span the open space in the compartments to reach a fixed part of an intermediate wall, and forming with a shorter fixed bed part in an alcove at an intermediate transverse wall, a full-length bed, said beds of the end compartments when in the use position being located at approximately the level of the seat cushion when in the use position, lower bed parts, each of half the full-bed length, in the intermediate compartment hinged at their lower ends to turn about horizontal transverse axes at the two intermediate transverse walls and forming together a full-length bed, and a full-length upper bed frame in the intermediate compartment hinged at its lower edge at the outer side wall to swing down to form a full-length bed, the upper end of the hinged bed parts of the end compartments, when stowed, having an elevation above the lower end of the stowed end-hinged bed parts of the intermediate compartment, and the upper end of the end-hinged bed parts of the intermediate compartment, when stowed, extending into the use position of the full-length side-hinged upper bed part.

2. A unit compartment arrangement as set forth in claim 1, which is further characterized by the fact that the intemediate compartment has a floor at a level higher than the aisle floor level and that both beds in the intermediate compartment are located at levels higher than the level of the beds in the two end compartments.

3. A unit compartment arrangement as set forth in claim 1, which is further characterized by the fact that the disposition of parts is approximately symmetrical about a central vertical transverse plane, the two end compartments being substantially reverse or mirror duplicates of each other with beds at the lowest of the three bed levels and the intermediate compartment being approximately symmetrical about the central vertical transverse plane with the bed alcoves at each end providing co-terminal walls for the ends of the bed spaces at the two higher of the three bed levels.

4. A unit compartment arrangement as set forth in claim 1, which is further characterized by the fact that the disposition of parts is approximately symmetrical about a central vertical transverse plane, the two end transverse walls being generally plane throughout their extent and the two intermediate transverse walls providing all the bed alcove offsets, toilets for the compartments at the two intermediate transverse walls, said toilets being located at the aisle wall side clear of the bed zone and the bed storage alcoves, leaving the space at the end walls outside the bed zone free of obstruction, and a doorway and door in each end wall outside the bed zone.

References Cited in the file of this patent
UNITED STATES PATENTS

| | | |
|---|---|---|
| 2,531,687 | Jones | Nov. 28, 1950 |
| 2,545,523 | Loewy | Mar. 20, 1951 |
| 2,583,960 | Murphy | Jan. 29, 1952 |
| 2,599,606 | Burgess | June 10, 1952 |
| 2,600,706 | Tully et al. | June 17, 1952 |
| 2,724,347 | Watter | Nov. 22, 1955 |
| 2,743,683 | Calhoun | May 1, 1956 |
| 2,808,787 | Murphy | Oct. 8, 1957 |